US012001285B2

(12) United States Patent
Chen

(10) Patent No.: US 12,001,285 B2
(45) Date of Patent: Jun. 4, 2024

(54) SYSTEM BOOTING METHOD AND APPARATUS, NODE DEVICE, AND COMPUTER-READABLE STORAGE MEDIUM

(71) Applicant: Huawei Technologies Co., Ltd., Shenzhen (CN)

(72) Inventor: Ming Chen, Chengu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 17/704,713

(22) Filed: Mar. 25, 2022

(65) Prior Publication Data

US 2022/0214945 A1 Jul. 7, 2022

Related U.S. Application Data

(63) Continuation of application No. PCT/CN2020/117150, filed on Sep. 23, 2020.

(30) Foreign Application Priority Data

Sep. 29, 2019 (CN) .......................... 201910935747.9

(51) Int. Cl.
G06F 11/14 (2006.01)
G06F 9/4401 (2018.01)
(52) U.S. Cl.
CPC .......... *G06F 11/1417* (2013.01); *G06F 9/441* (2013.01)
(58) Field of Classification Search
CPC .............................. G06F 9/441; G06F 11/1417

USPC ......................................................... 713/1, 2
See application file for complete search history.

(56) References Cited

U.S. PATENT DOCUMENTS

| 6,934,881 | B2 * | 8/2005 | Gold | G06F 11/1469 714/6.24 |
| 6,948,099 | B1 * | 9/2005 | Tallam | G06F 11/1417 714/38.14 |
| 7,734,945 | B1 * | 6/2010 | Levidow | G06F 11/0793 714/3 |
| 7,962,739 | B2 * | 6/2011 | Childs | G06F 11/1417 713/1 |
| 2006/0107030 | A1 | 5/2006 | Biondi et al. | |

(Continued)

FOREIGN PATENT DOCUMENTS

| CN | 101226485 A | 7/2008 |
| CN | 102053841 A | 5/2011 |

(Continued)

OTHER PUBLICATIONS

Shen Hua et al., "Software and hardware development and application of embedded Linux system," Books published by Beihang University Press in 2013, with an English abstract, 16 pages.

(Continued)

*Primary Examiner* — Joseph R Kudirka
(74) *Attorney, Agent, or Firm* — Conley Rose, P.C.

(57) ABSTRACT

A system booting method, a node device, and a computer-readable storage medium relate to the technical field of operating systems and include determining a location of a first operating system to be booted by the node device in a target persistent memory; and booting, based on the location of the first operating system and by the node device, the first operating system.

17 Claims, 6 Drawing Sheets

(56) References Cited

U.S. PATENT DOCUMENTS

| | | | |
|---|---|---|---|
| 2008/0126921 A1* | 5/2008 | Chen .................. | G06F 9/4401 713/2 |
| 2018/0173419 A1* | 6/2018 | Dubeyko ............ | G06F 3/0688 |
| 2022/0214945 A1 | 7/2022 | Chen et al. | |

FOREIGN PATENT DOCUMENTS

| | | |
|---|---|---|
| CN | 103473102 A | 12/2013 |
| CN | 103645972 A | 3/2014 |
| CN | 105573864 A | 5/2016 |
| CN | 105786545 A | 7/2016 |
| CN | 106126206 A | 11/2016 |
| CN | 106843192 A | 6/2017 |
| CN | 107219997 A | 9/2017 |
| CN | 107729743 A | 2/2018 |
| CN | 109491603 A | 3/2019 |
| CN | 110780942 A | 2/2020 |
| IN | 105389190 A | 3/2016 |

OTHER PUBLICATIONS

Shanghai Vocational Training and Guidance Center "Linux System Administrator—Level 4," Shanghai Jiao Tong University Press, May 2006, with an English abstract, 5 pages.

Lu Weigong et al., "Embedded Computer System Design," Books published by Harbin Institute of Technology Press in 2017, with an English abstract, 18 pages.

\* cited by examiner

SYSTEM BOOTING METHOD AND APPARATUS, NODE DEVICE, AND COMPUTER-READABLE STORAGE MEDIUM

CROSS-REFERENCE TO RELATED APPLICATIONS

This application is a continuation of International Patent Application No. PCT/CN2020/117150 filed on Sep. 23, 2020, which claims priority to Chinese Patent Application No. 201910935747.9 filed on Sep. 29, 2019. The disclosures of the aforementioned applications are hereby incorporated by reference in their entireties.

TECHNICAL FIELD

This application relates to the technical field of operating systems, and in particular, to a system booting method and apparatus, a node device, and a computer-readable storage medium.

BACKGROUND

For any node device in a distributed storage system, when a hardware soft failure, a software update, or an operating system update occurs on the node device, the node device may be reset or powered on or off to resolve the fault. Further, after the node device is reset or powered on again, the node device may reboot an operating system to resolve the fault.

The operating system may be booted by using the following process. A basic input/output system (BIOS) in the node device checks whether a peripheral key device (such as a memory, a graphics card, a keyboard and a mouse) is running properly. If the peripheral key device is running properly, the BIOS determines a loading disk (such as a hard disk or a compact disc (CD)) for booting the operating system, and executes content on a master boot record (MBR) on the loading disk, where the MBR stores master bootloader information and a bootloader (GRand Unified Bootloader (GRUB)) indicated by the master bootloader information. The GRUB loads a kernel of the operating system to the memory. The kernel loads various device drivers related to a storage medium. After a required driver is loaded, a root file system is mounted in a read-only manner, and parent processes of all other processes of the operating system are executed. The parent processes initialize the operating system. When initialization is completed, the operating system is booted.

In the foregoing process of booting the operating system, a large amount of time is occupied for loading various types of information (for example, the MBR, the GRUB, and the kernel) and configuring the operating system (such as mounting the root file system), resulting in a relatively long time for booting the operating system.

SUMMARY

Embodiments of this application provide a system booting method and apparatus, a node device, and a computer-readable storage medium, so as to reduce boot time of an operating system. The technical solutions are as follows.

In a first aspect, a system booting method is provided, where the method includes determining a location, in a target persistent memory, of a first operating system to be booted by a node device, and booting the first operating system in the target persistent memory based on the location of the first operating system in the target persistent memory.

In this method, the first operating system to be booted is directly booted in the target persistent memory, thereby avoiding loading various types of information and configuring the operating system, and reducing boot time of the operating system.

In a possible implementation, the method further includes determining a system boot source of the first operating system, where the system boot source is used to indicate a boot location of the first operating system, and the boot location of the first operating system includes at least one of a persistent memory and a persistent storage medium.

Based on the foregoing possible implementation, different booting manners are provided for different system boot sources.

In a possible implementation, booting the first operating system in the target persistent memory based on the location of the first operating system in the target persistent memory includes detecting, based on the location of the first operating system in the target persistent memory, whether the first operating system stored in the target persistent memory is damaged, if the first operating system stored in the target persistent memory is not damaged, booting the first operating system in the target persistent memory, or if the first operating system stored in the target persistent memory is damaged, querying a target storage medium that is in the node device and that stores a second operating system, and repairing the first operating system in the target persistent memory based on the second operating system in the target storage medium, and booting the repaired first operating system in the target persistent memory, where the second operating system is a backup of the first operating system.

In a possible implementation, booting the first operating system in the target persistent memory based on the location of the first operating system in the target persistent memory includes directly booting the first operating system in the target persistent memory for a preset quantity of times based on the location of the first operating system in the target persistent memory, and if the first operating system is not successfully booted after having been booted for the preset quantity of times, detecting, based on the location of the first operating system in the target persistent memory, whether the first operating system stored in the target persistent memory is damaged, if the first operating system stored in the target persistent memory is not damaged, booting the first operating system in the target persistent memory, or if the first operating system stored in the target persistent memory is damaged, querying a target storage medium that is in the node device and that stores a second operating system, and repairing the first operating system in the target persistent memory based on the second operating system in the target storage medium, and booting the repaired first operating system in the target persistent memory, where the second operating system is a backup of the first operating system.

In a possible implementation, the method further includes detecting whether the second operating system stored in the target storage medium is damaged, and if the second operating system stored in the target storage medium is not damaged, performing the step of repairing the first operating system in the target persistent memory based on the second operating system in the target storage medium, or if the second operating system stored in the target storage medium is damaged, terminating booting the first operating system.

In a possible implementation, detecting, based on the location of the first operating system in the target persistent memory, whether the first operating system stored in the target persistent memory is damaged includes performing a target operation on the first operating system based on the location of the first operating system in the target persistent memory, to obtain first description information, where the first description information is used to indicate the first operating system, and when the first description information is consistent with second description information, determining that the first operating system is not damaged, or when the first description information is not consistent with second description information, determining that the first operating system is damaged, where the second description information is used to indicate to update to a target operating system updated of the first operating system.

Based on the foregoing possible implementation, latest description information of the first operating system can be quickly searched for, and whether the current first operating system is damaged is determined based on the latest description information of the first operating system, thereby improving determining efficiency.

In a possible implementation, the method further includes displaying an operating system login interface when the first operating system is successfully booted, where the operating system login interface is used to log in to the first operating system.

In a second aspect, a system booting apparatus configured to perform the foregoing system booting method is provided. Further, the system booting apparatus includes a module configured to perform the system booting method provided in the first aspect or any optional manner of the first aspect.

In a third aspect, a node device is provided, where the node device includes a processor and a memory, the memory stores at least one instruction, and the instruction is loaded and executed by the processor to implement an operation performed in the foregoing system booting method.

In a fourth aspect, a computer-readable storage medium is provided, where the storage medium stores at least one instruction, and the instruction is loaded and executed by a processor to implement an operation performed in the foregoing system booting method.

BRIEF DESCRIPTION OF DRAWINGS

To describe technical solutions in some of the embodiments of this application more clearly, the following briefly describes the accompanying drawings describing the embodiments. It is clear that the accompanying drawings in the following descriptions show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes implementations of this application in detail with reference to the accompanying drawings.

Figure 1:
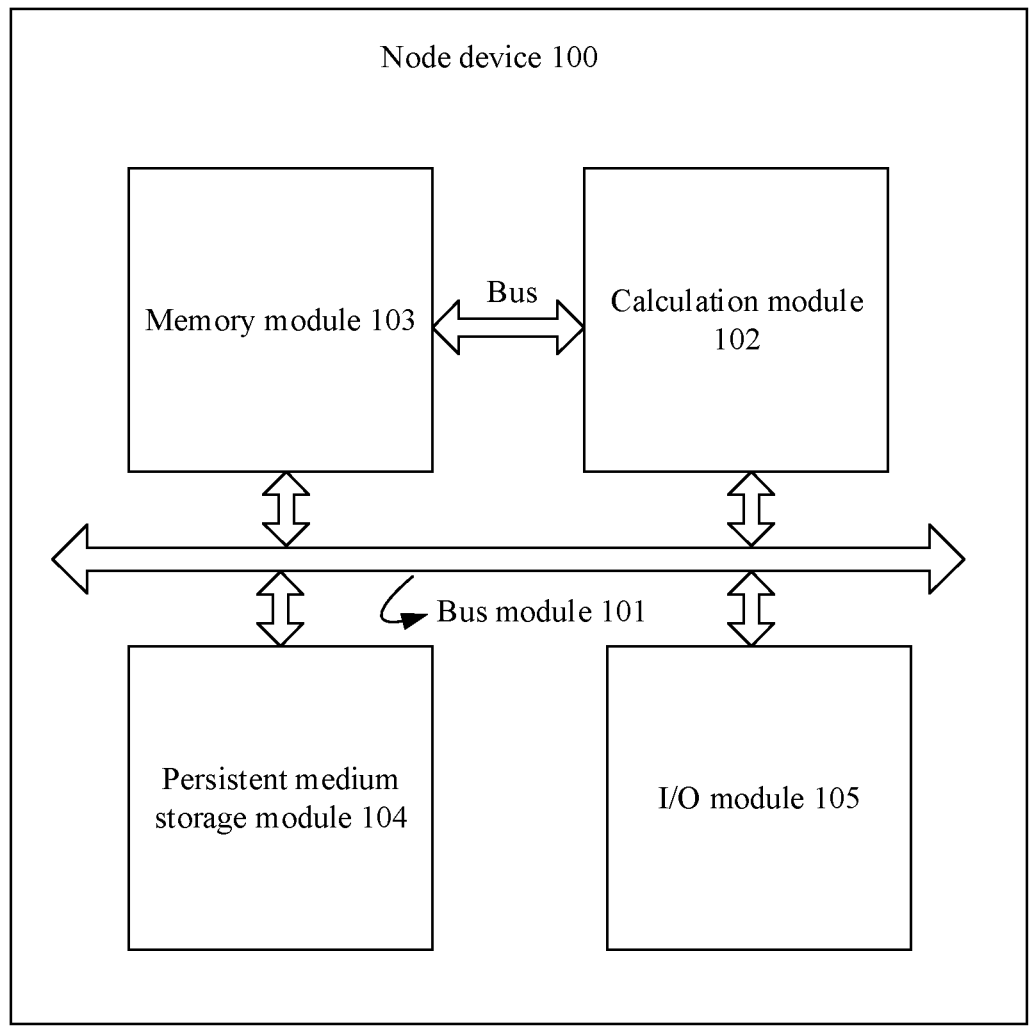
FIG. 1 is a schematic diagram of a node device according to an embodiment of this application.

FIG. 1 is a schematic diagram of a node device according to an embodiment of this application. Referring to FIG. 1, the node device 100 includes a bus module 101, a calculation module 102, a memory module 103, a persistent medium storage module 104, and an input/output (I/O) module 105. The node device may be any device in a distributed storage system, or may be any device in another system, such as a blockchain system.

The bus module 101 includes an internal basic bus of an operating system. The basic bus may convert a communication protocol, and implement communication among modules of the node device by converting the communication protocol. The basic bus may include a Peripheral Component Interconnect (PCI) bus in an X86 architecture and may also include a host controller interface bus. Protocols converted by the bus module 101 may include a high-speed serial computer extension bus standard (PCI Express (PCIE) protocol, a serial attached small computer system interface (SAS) protocol, a Serial Advanced Technology Attachment (SATA) protocol, a Transmission Control Protocol (TCP), an Internet Protocol (IP), a high-speed serial transmission bus (fibre channel (FC), an InfiniBand (IB) protocol, and the like. The converted communication protocols are not limited in this embodiment of this application.

The calculation module 102 has a function of performing a basic data operation, and can process data in each of the modules in the node device. The calculation module 102 may directly perform data exchange with the memory module 103 by using a bus. The calculation module 102 may perform data exchange with the memory module 103 to boot an operating system in the memory module 103. Therefore, the operating system does not need to be booted in a persistent storage medium such as a hard disk, and boot time of the operating system is reduced. The calculation module may include a processor (central processing units (CPU).

The memory module 103 includes at least one persistent memory. All memory space or some memory space in each persistent memory has a persistency capability. Having a persistency capability means that without being powered, memory space having a persistency capability can save data that has been stored when being powered. In addition, each persistent memory can meet a read-write response delay requirement required by the calculation module, for example, a microsecond-level time requirement or a higher requirement. Each persistent memory may store at least one operating system, the operating system stored in the persistent memory may be directly booted in the persistent memory, and each operating system may have at least one backup in the at least one persistent memory, so that when an operating system to be booted is damaged, the damaged operating system can be repaired based on a backup operating system to avoid affecting a service provided by the node device. The persistent memory may be an Apache Pass (AEP). The persistent memory is not limited in this embodiment of this application.

The persistent medium storage module 104 may include at least one persistent storage medium, such as a solid state drive (SSD), a hard disk drive (HDD), a CD, and a Universal Serial Bus flash disk. The at least one persistent storage medium may also store at least one operating system. The operating system stored in the persistent storage medium may be a copy of the operating system stored in the persistent memory. Certainly, the operating system stored in the persistent storage medium may alternatively be different from the operating system stored in the persistent memory. The at least one persistent storage medium may be separately connected to the bus, and connected to another module by using the bus, so that the other module can access the at least one persistent storage medium by using the bus. The persistent medium storage module 104 may further include a controller, and the controller collectively connects the at least one persistent storage medium to the bus, so that another module can access the at least one persistent storage medium by using the bus. A connection manner of the at least one persistent storage medium is not limited in this embodiment of this application. It should be noted that, when the node device does not need to boot the operating system from the persistent medium storage module 104, or the persistent memory in the memory module can meet a service requirement, the node device may not have the persistent medium storage module 104. That is, the persistent medium storage module 104 is an optional module.

The I/O module 105 includes at least one I/O interface, where the at least one I/O interface is configured to establish a connection between the node device and an external device, and the node device may perform data exchange with the external device by using the I/O module 105.

Figure 2:
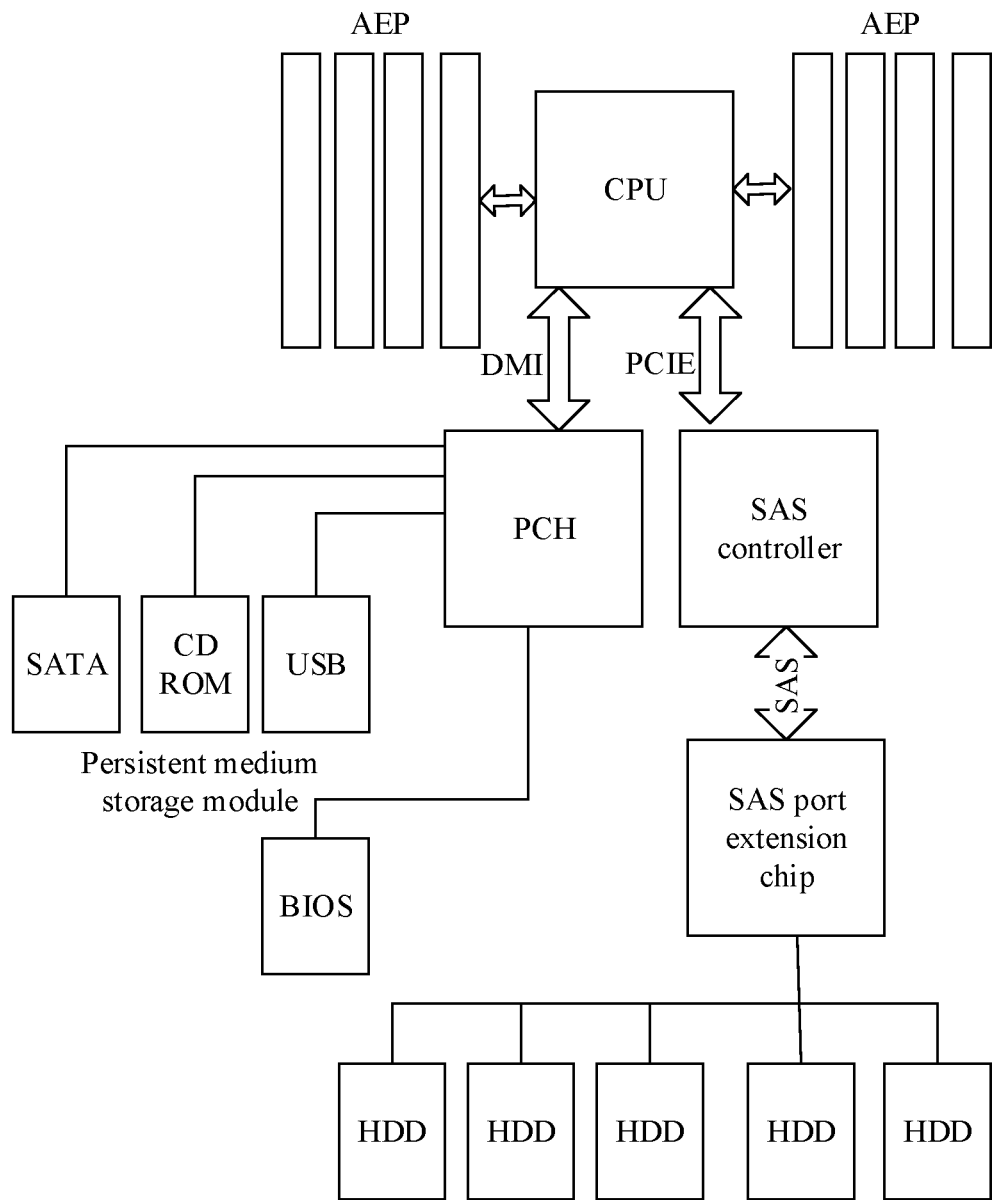
FIG. 2 is a block diagram of a hardware system of a node device according to an embodiment of this application.

To further describe a specific connection manner between the foregoing modules and connections within the modules, refer to a block diagram of a hardware system of a node device according to an embodiment of this application shown in FIG. 2. FIG. 2 is comprehensively described by using the following steps A to H.

Step A: All or some memories in the memory module of the node device are installed as AEP, so that data stored in the memory module can be persistent, and communication with the CPU is established by using the bus, where the CPU refers to the calculation module.

Step B: The CPU performs data processing on another peripheral device, where the other peripheral device may include AEP or the like.

Step C: A Direct Media Interface (DMI) converts a PCI bus protocol inside the CPU into a DMI protocol, so that the CPU can communicate with a Platform Controller Hub (PCH) by using the DMI protocol.

Step D: A PCIE converts the PCI bus protocol in the CPU into the PCIE protocol, so that the CPU can communicate with a SAS control chip by using the PCIE protocol.

The bus module of the node device may include the DMI and the PCIE in steps C and D.

Step E: A SATA hard disk, a CD read-only memory (CD-ROM), and a USB are separately connected to the PCH and may communicate with the PCH.

The persistent medium storage module of the node device may include the SATA, the CD-ROM, the USB, and the like. The operating system may be booted in the SATA, the CD-ROM, or the USB.

Step F: The PCH establishes a connection to a BIOS, so that the CPU can communicate with the BIOS by using the PCH, that is, the PCH can complete a connection between the CPU and a peripheral external device.

Step G: A SAS controller can convert the PCIE protocol converted by the DMI into a SAS protocol.

Step H: A SAS port extension chip may be connected to the SAS controller, and each interface of the SAS port extension chip may be connected to one persistent storage medium, for example, an HDD, so that more persistent storage media are installed in the node device.

It can be learned that the SAS port extension chip is configured to extend a port of the SAS controller, so that the CPU can access, by using the SAS controller and the SAS port extension chip, the persistent storage medium connected to the SAS port extension chip.

The persistent medium storage module of the node device may further include the SAS controller, the SAS port extension chip, and a plurality of persistent storage media connected to the SAS port extension chip.

Figure 3:
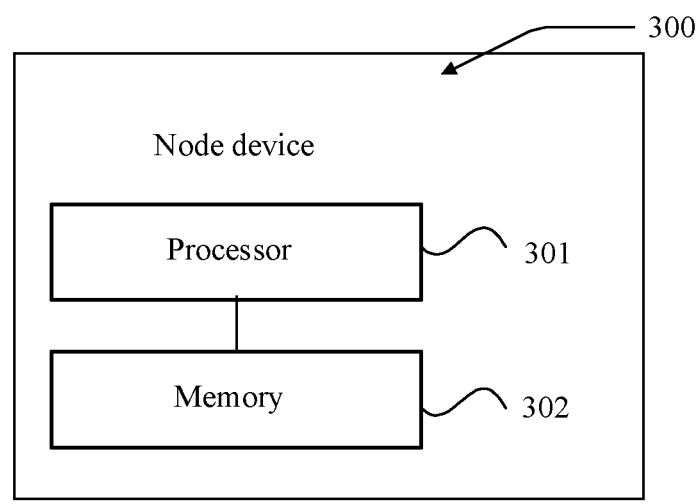
FIG. 3 is a schematic diagram of a structure of a node device according to an embodiment of this application.

To further describe a specific hardware structure of the node device, refer to FIG. 3 for a schematic diagram of a structure of a node device according to an embodiment of this application. A node device 300 may be relatively different due to different configurations or performance and may include one or more CPUs 301 and one or more memories 302. The memory 302 stores at least one instruction, and the at least one instruction is loaded and executed by the processor 301 to implement methods provided in the following method embodiments. Certainly, the node device 300 may further have components such as a wired network interface or a wireless network interface, a keyboard, and an input/output interface, so as to perform input/output. The node device 300 may further include another component configured to implement a device function. Details are not described herein.

In an example embodiment, a computer-readable storage medium, for example, a memory including instructions, is further provided. The instruction may be executed by a processor in a terminal to complete the system booting method in the following embodiment. For example, the computer-readable storage medium may be a ROM, a random-access memory (RAM), a CD-ROM, a magnetic tape, a floppy disk, and an optical data storage device.

Figure 4:
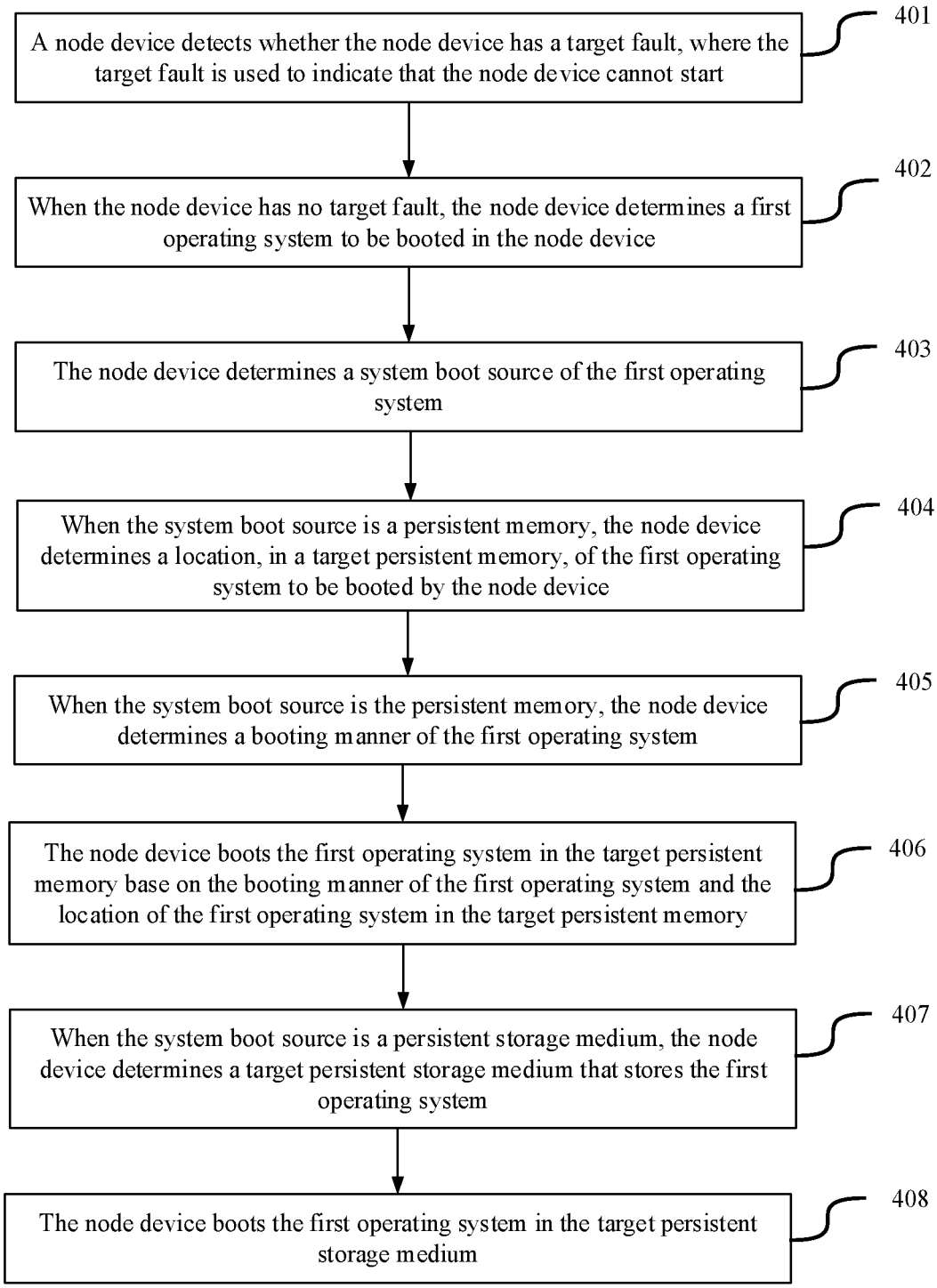
FIG. 4 is a flowchart of a system booting method according to an embodiment of this application.

FIG. 4 is a flowchart of a system booting method according to an embodiment of this application. A process of the method includes the following steps 401 to 408.

401. A node device detects whether the node device has a target fault, where the target fault is used to indicate that the node device cannot start.

The node device may be any device in a distributed storage system. When the node device is shut down, if a power supply of the node device is turned on, the node device is powered on and begins to start. For example, when a user clicks a power-on button of the node device, the node device begins to start. When the node device is reset, all circuits in the node device are restored to an initial state. If the node device is de-reset, the node device begins to restart. For example, when a user clicks a restart button of the node device, the node device restarts.

When the node device starts, to ensure normal running of starting, the node device may first perform detection in a hardware aspect during a starting process to detect whether the node device has the target fault. If the node device has the target fault, it indicates that hardware of the node device has a fault, and the node device cannot start. In this case, the node device may directly terminate restarting and wait for maintenance by a technician. If the node device has no target fault, it indicates that the node device has no fault in the hardware aspect, and the node device may continue to start, that is, continue to perform the following step 402.

Step 401 may be implemented by executing BIOS code by a CPU in the node device. When the power supply of the node device is turned on or the node device is de-reset, the BIOS begins to detect modules in the node device. If an exception occurs in any module, the node device has the target fault. Then, the node device may directly terminate restarting and wait for maintenance by a technician. For example, if AEP in a memory module is loose, the BIOS detects that the AEP has the target fault, and the node device may display on a display interface that the APE has the target fault, so that a technician can perform corresponding maintenance. The target fault is not limited in this embodiment of this application.

402. When the node device has no target fault, the node device determines a first operating system to be booted in the node device.

The first operating system is any operating system stored in the node device. There may be various operating systems in the node device, and each operating system may have a plurality of copies. Therefore, the node device may determine the first operating system from at least one operating system stored in the node device. It should be noted that different types of operating systems are embodied in different versions, different manufacturers, different storage formats, and the like. In addition to fully backing up any operating system, the node device may partially back up any operating system.

In some embodiments, the node device may prestore a system booting sequence of various operating systems. For example, the booting sequence is booting an operating system A and then an operating system B. The node device may determine a first type of operating system in a system booting sequence as the first operating system based on a booting sequence of systems from front to back.

In some embodiments, because different users have different requirements, the system booting sequence may be set by the users, that is, the system booting sequence may be a default booting sequence in the node device itself, or may be a booting sequence specified by the users. The system booting sequence and a setting manner of the system booting sequence are not limited in this embodiment of this application herein.

403. The node device determines a system boot source of the first operating system, where the system boot source is used to indicate a boot location of the first operating system, and the boot location of the first operating system includes at least one of a persistent memory and a persistent storage medium.

When the boot location of the first operating system is the persistent memory, the system boot source is used to indicate to boot the operating system in the persistent memory, or when the boot location of the first operating system is the persistent storage medium, the system boot source is used to indicate to boot the operating system in the persistent storage medium, that is, the operating system cannot be booted in the persistent memory.

The node device may boot the first operating system in the persistent memory, and may also boot the first operating system in the persistent storage medium. Therefore, the node device may pre-store a ranking of boot locations. In a possible implementation, the ranking of boot locations is the persistent memory and then the persistent storage medium. In a possible implementation, the ranking of system boot locations is the persistent storage medium and then the persistent memory. In some embodiments, because different users have different requirements, the boot locations may be set by the users, that is, the ranking of boot locations may be a default ranking in the node device itself, or may be a ranking specified by the users. The ranking of boot locations and a setting manner of the ranking of boot locations are not limited in this embodiment of this application.

A process in which the node device determines the system boot source of the first operating system may be that the node device determines the system boot source of the first operating system based on the ranking of boot locations. For example, a system boot source used to indicate a boot location ranked first is used as the system boot source of the first operating system.

It should be noted that, when no persistent storage medium is installed in the node device, or an operating system in the node device does not need to be booted in the persistent storage medium, only the persistent memory may exist in the ranking of boot locations. In this case, the node device may determine the persistent memory as the boot location of the first operating system.

404. When the system boot source is the persistent memory, the node device determines a location, in a target persistent memory, of the first operating system to be booted by the node device.

The node device may first determine the target persistent memory from at least one persistent memory in the node device and then determine the location of the first operating system in the target persistent memory. The node device may store a plurality of copies of each operating system, and a storage medium that stores the operating system or a copy of the operating system may be either a persistent memory or a persistent storage medium. Therefore, the node device may pre-store basic information of each operating system, so as to determine a storage location of each operating system based on the basic information of the operating system.

Basic information of the first operating system may include a category identifier, a system identifier, a copy number, a medium identifier, and a storage location. The category identifier is used to indicate a category of the first operating system, the system identifier is used to indicate whether the first operating system is a system copy, and the copy number is used to indicate a number of the system copy. For example, if an operating system X is a third copy of an operating system Y, a copy number of the operating system X is 3, and a copy number of the operating system Y is 0. The medium identifier is used to indicate whether a storage medium that stores the first operating system is a persistent memory or a persistent storage medium. The storage location of the first operating system may include a medium number and an offset address corresponding to the medium number. The medium number is a number of the storage medium that stores the first operating system. A storage medium that stores an operating system includes a persistent memory and a persistent storage medium. The node device may pre-number the persistent memory and the persistent storage medium in the node device, so that each storage medium has a number. The offset address corresponding to the medium number is an address where the storage medium indicated by the medium number stores the any operating system. It should be noted that a specific configuration manner and a storage manner of the description information are not limited in this embodiment of this application.

When the system boot source is the persistent memory, the node device may determine the target persistent memory based on the medium number in the basic information of the first operating system. It may be understood that the storage medium indicated by the medium number in the basic information of the first operating system is the target persistent memory. A process of determining the target persistent memory is not limited in this embodiment of the present invention.

It should be noted that, the node device may alternatively first determine the system boot source, and then determine the first operating system to be booted and the target persistent memory, that is, may first perform step 403 and then steps 402 and 404. Certainly, the node device may alternatively first determine the target persistent memory used to boot the operating system, and then determine the first operating system to be booted, that is, may first perform step 404 and then step 402. A performing sequence of steps 402 and 403 is not limited in this embodiment of this application.

It should be noted that, the process shown in step 402 and step 404 is a process of determining, when the node device has no target fault, the first operating system to be booted in the node device and the target persistent memory that stores the first operating system.

It should be noted that, when the node device boots the first operating system in the persistent memory by default, the node device may alternatively directly perform step 404 without determining the boot source.

405. When the system boot source is the persistent memory, the node device determines a booting manner of the first operating system.

Different system boot sources may have different booting manners. When the system boot source is the persistent memory, a booting manner of the operating system may include any one of a validation-free manner, a validation manner, and a combination manner, where the validation-free manner is to directly boot the operating system in the persistent memory. For details, refer to the following step 61. The validation manner is to first perform validation on the operating system, and when the validation succeeds, boot the operating system in the persistent memory. For details, refer to the following step 62. The combination manner is a combination of the validation-free manner and the validation manner. In a possible implementation, for the first operating system, the first operating system is first booted for N times in the validation-free manner. If the first operating system is still not successfully booted for the Nth time, the operating system is booted in the validation manner, where N is a positive integer greater than 1. For details, refer to the following step 63.

When the system boot source is the persistent storage medium, the booting manner of the first operating system is booting the first operating system in the persistent storage medium. For details, refer to the following steps 407 and 408.

The node device may store a ranking of the foregoing three booting manners, for example, the ranking is the validation-free manner, the validation manner, and then the combination manner. The node device may use a booting manner ranked first among the three booting manners as the booting manner of the first operating system. Certainly, the booting manner of the first operating system may be specified by a user, and a booting manner specified by the user is used as the booting manner of the first operating system. For example, if the booting manner specified by the user is the validation-free manner, the node device may directly use the validation-free manner as the booting manner of the first operating system. The ranking of the booting manners, a booting manner specified by user equipment, and a process of determining the booting manner of the first operating system are not limited in this embodiment of this application.

406. The node device boots the first operating system in the target persistent memory based on the booting manner of the first operating system and the location of the first operating system in the target persistent memory.

For different booting manners, specific processes in which the node device boots the first operating system are different.

In a possible implementation, step 406 may be implemented by using any process shown in the following steps 61 to 63.

Step 61: When the booting manner is a detection-free booting manner, the node device directly boots the first operating system in the target persistent memory based on the location of the first operating system in the target persistent memory.

A system file of the first operating system is stored at the offset address in the storage location of the first operating system. The offset address is an address in the target persistent memory of the first operating system, and a location indicated by the offset address is the location of the first operating system in the target persistent memory. Therefore, in a possible implementation, the node device executes the system file at the offset address in the target persistent memory, so as to boot the first operating system.

When the first operating system is successfully booted, the node device displays an operating system login interface. The operating system login interface is used to log in to the first operating system, and the operating system login interface may include an account login box, a password login box, and an OK button. When a user enters a correct account in the account login box, enters a password corresponding to the account in the password login box, and then clicks the OK button, the node device may display an operation interface of the first operating system, so that the user can perform an operation on the operation interface of the first operating system based on the first operating system.

In some embodiments, when some or all system files at the offset address cannot be executed, the first operating system fails to be booted, and the node device may terminate booting and wait for a user of the node device to perform maintenance.

In some embodiments, if the first operating system is not successfully booted for the first time, the node device boots the first operating system for a preset quantity of times in the target persistent memory. If the first operating system is still not successfully booted after having been booted for a target quantity of times, the node device may terminate booting the first operating system, and wait for the user of the node device to perform maintenance.

Step 62: When the booting manner is a detection booting manner, the node device detects, based on the location of the first operating system in the target persistent memory, whether the first operating system stored in the target persistent memory is damaged, if the first operating system stored in the target persistent memory is not damaged, the node device boots the first operating system in the target persistent memory, or if the first operating system stored in the target persistent memory is damaged, the node device queries a target storage medium that is in the node device and that stores a second operating system, and repairs the first operating system in the target persistent memory based on the second operating system in the target storage medium, and boots the repaired first operating system in the target persistent memory, where the second operating system is a backup of the first operating system.

The first operating system may be damaged because the first operating system has not been updated, or a system file in the first operating system is lost. When the first operating system is damaged, the first operating system may be unable to be booted. In this case, the node device may first detect whether the first operating system is damaged. If the first operating system is not damaged, the node device may directly boot the first operating system in the target persistent memory. It should be noted that a process of directly booting the first operating system in the target persistent memory is described in step 51. Details are not described herein again.

The process of detecting, based on the location of the first operating system in the target persistent memory, whether the first operating system stored in the target persistent memory is damaged may include performing a target operation on the current first operating system based on the location of the first operating system in the target persistent memory, to obtain first description information, where the first description information is used to indicate the first operating system, when the first description information is consistent with second description information, the node device determines that the first operating system is not damaged, or when the first description information is not consistent with second description information, the node device determines that the first operating system is damaged, where the second description information is used to indicate a target operating system which is updated to the first operating system.

Performing a target operation on the current first operating system based on the location of the first operating system in the target persistent memory, to obtain first description information may include obtaining the first operating system at the location of the first operating system in the target persistent memory, and performing target running on the obtained operating system to obtain the first description information.

The target operation may be a hash operation, and the first description information of the first operating system may be a hash value of the first operating system. Certainly, the target operation may be another operation for generating description information of the operating system. The target operation is not limited in this embodiment of this application. Description information of any operating system may describe a basic operating system, a driver, an application program, and the like of the any operating system, so that the description information of the any operating system is used to indicate the any operating system. Then, the first description information of the first operating system may indicate at least the first operating system.

It should be noted that, when the node device stores the first operating system for the first time, the node device may perform the target operation on the first operating system to obtain description information describing the first operating system, and store the description information of the first operating system. Each time the first operating system is updated, the node device performs the target calculation on the updated first operating system to obtain new description information used to indicate the updated first operating system, and updates originally stored description information of the first operating system to latest calculated description information of the first operating system.

It should be noted that the node device may store the description information of the first operating system in the basic information of the first operating system. Each time the node device updates the first operating system, the node device may directly update the description information of the first operating system stored in the node device. In this way, when the node device subsequently determines whether the first operating system has a fault, the node device may quickly search for latest description information of the first operating system, and determine, based on the latest description information of the first operating system, whether the current first operating system is damaged, thereby improving determining efficiency.

When the first operating system in the target persistent memory is damaged, the node device may query whether the node device has a target storage medium that stores the second operating system. When the target storage medium exists, the first node device may repair the first operating system in the target persistent memory based on the second operating system in the target storage medium, and boot the second operating system in the target persistent memory, or when the node device does not find the target storage medium, it indicates that the node device does not have a copy of the first operating system. In this case, the node device may terminate booting the first operating system, and wait for the user of the node device to perform maintenance. The target storage medium may be any persistent memory, or may be any persistent storage medium. The target storage medium is not limited in this embodiment of this application.

A manner in which the node device queries the target storage medium may be any manner in the following manners 1 and 2.

Manner 1: The node device traverses an operating system stored in each storage medium in the node device, and when the second operating system is stored in any storage medium, the node device determines the any storage medium as the target storage medium.

Manner 2: The node device traverses description information of each operating system. When a copy number in description information of any operating system is greater than 0 and is a copy number of the first operating system, the node device determines the any operating system as the second operating system. The node device determines a storage medium indicated by a medium number in the description information of the any operating system as the target storage medium.

That the node device repairs the first operating system in the target persistent memory based on the second operating system in the target storage medium includes: The node device deletes the damaged first operating system in the target persistent memory and copies the second operating system to the offset address corresponding to the first operating system in the target persistent memory. Alternatively, the node device directly overwrites the damaged first operating system in the target persistent memory by using the copied second operating system.

In some embodiments, in consideration that the second operating system in the target storage medium may also be damaged, before repairing the first operating system in the target persistent memory based on the second operating system in the target storage medium, the node device may detect whether the second operating system stored in the target storage medium is damaged. If the second operating system stored in the target storage medium is not damaged, the node device repairs the first operating system in the target persistent memory based on the second operating system in the target storage medium, or if the second operating system stored in the target storage medium is damaged, the node device terminates booting the first operating system. A process in which the node device detects whether the second operating system is damaged is similar to the process in which the node device detects whether the first operating system is damaged. Details about the process of detecting whether the second operating system is damaged are not described herein in this embodiment of this application.

In some embodiments, when the second operating system in the target storage medium is damaged, the node device may further query whether another copy of the first operating system further exists in the node device. When the other copy exists, the node device may detect whether the other copy is damaged. If the other copy is not damaged, the node device may repair the first operating system in the target persistent memory based on the other copy. When no another copy exists, the node device terminates booting the first operating system.

In some embodiments, in consideration that an ultimate goal of the node device is to successfully boot the first operating system, when the target storage medium is a persistent memory, the node device may not perform the step of repairing the first operating system in the target persistent memory based on the second operating system in the target storage medium, but directly boot the second operating system in the storage medium, so that time for booting the first operating system can be further reduced.

It should be noted that a process in which the node device boots the second operating system in the target persistent memory is similar to the process in which the node device directly boots the first operating system in the target persistent memory. Details about directly booting the second operating system in the target persistent memory are not described herein in this embodiment of this application.

Step 63: When the booting manner is a combination booting manner, the node device boots the first operating system for a preset quantity of times based on the detection-free booting manner. If the first operating system is not successfully booted after having been booted for the preset quantity of times, the node device boots the first operating system based on the detection booting manner.

The process shown in step 63 may include the following steps 631 and 632.

Step 631: The node device directly boots the first operating system in the target persistent memory for the preset quantity of times based on the location of the first operating system in the target persistent memory.

That the node device directly boots the first operating system once means that the node device boots the first operating system once in the detection-free booting manner in step 61. After the first operating system is successfully booted within the preset quantity of times, an operating system login interface is displayed, where the operating system login interface is used to log in to the first operating system. It should be noted that the preset quantity of times is not limited in this embodiment of this application.

Step 632: If the first operating system is not successfully booted after having been booted for the preset quantity of times, the node device detects, based on the location of the first operating system in the target persistent memory, whether the first operating system stored in the target persistent memory is damaged, if the first operating system stored in the target persistent memory is not damaged, the node device boots the first operating system in the target persistent memory, or if the first operating system stored in the target persistent memory is damaged, the node device queries a target storage medium that is in the node device and that stores a second operating system, and repairs the first operating system in the target persistent memory based on the second operating system in the target storage medium, and boots the repaired first operating system in the target persistent memory, where the second operating system is a backup of the first operating system.

If the first operating system is not successfully booted after having been booted for the preset quantity of times, it indicates that the first operating system in the target persistent memory may be damaged. In this case, the node device may boot the first operating system by performing step 632.

The process shown in step 632 is similar to the process shown in step 62. Details about step 632 are not described herein in this embodiment of this application.

It should be noted that, the process shown in step 406 is the process of booting the first operating system in the target persistent memory based on the location of the first operating system in the target persistent memory. The three manners of booting the first operating system shown in step 406 are all implemented in the persistent memory of the node device, thereby avoiding loading various types of information and configuring the operating system, and reducing boot time of the operating system.

407. When the system boot source is the persistent storage medium, the node device determines a target persistent storage medium that stores the first operating system.

The node device determines the target persistent storage medium from at least one persistent storage medium in the node device. A process of determining the target persistent storage medium is similar to the process of determining the target persistent memory in step 404. Details about step 407 are not described herein in this embodiment of this application.

408. The node device boots the first operating system in the target persistent storage medium.

In a possible implementation, the node device determines an MBR on the execution target persistent storage medium. The MBR stores master bootloader information and a GRUB indicated by the master bootloader information, the GRUB loads a kernel of the first operating system into any persistent memory, and the any persistent memory loads various device drivers related to the any persistent memory. When a required driver is loaded, a root file system is mounted in a read-only manner, and a parent process is executed. The parent process initializes the first operating system. When initialization is completed, the first operating system is booted.

If the first operating system is not successfully booted in the target persistent storage medium, the node device may directly terminate booting the first operating system, or copy another copy of the first operating system to the target persistent storage medium and boot the other copy of the first operating system in the target persistent storage medium. If the other copy of the first operating system is still not successfully booted, the node device terminates booting the first operating system. When the first operating system is successfully booted, the node device may display a login interface of the first operating system.

It should be noted that a manner in which the node device boots the first operating system in the target persistent storage medium is not limited in this embodiment of this application.

The processes shown in steps 401 to 408 provide processes of booting the first operating system for different system boot sources. After the first operating system is booted in the node device, the node device may update the first operating system in the target persistent memory to a third operating system. The node device updates the second operating system stored in the target storage medium in the node device to the third operating system, where the third operating system is a backup of the first operating system, so that the node device can update all copies of the first operating system in the node device to the third operating system.

The node device may further perform the target operation on the third operating system to obtain third description information, where the third description information is used to indicate the third operating system, and stores the description information of the third operating system. A process of storing the description information of the third operating system may be that the node device updates the first description information of the first operating system to the third description information, and updates a hash value of the second operating system to the third description information.

Figure 5:
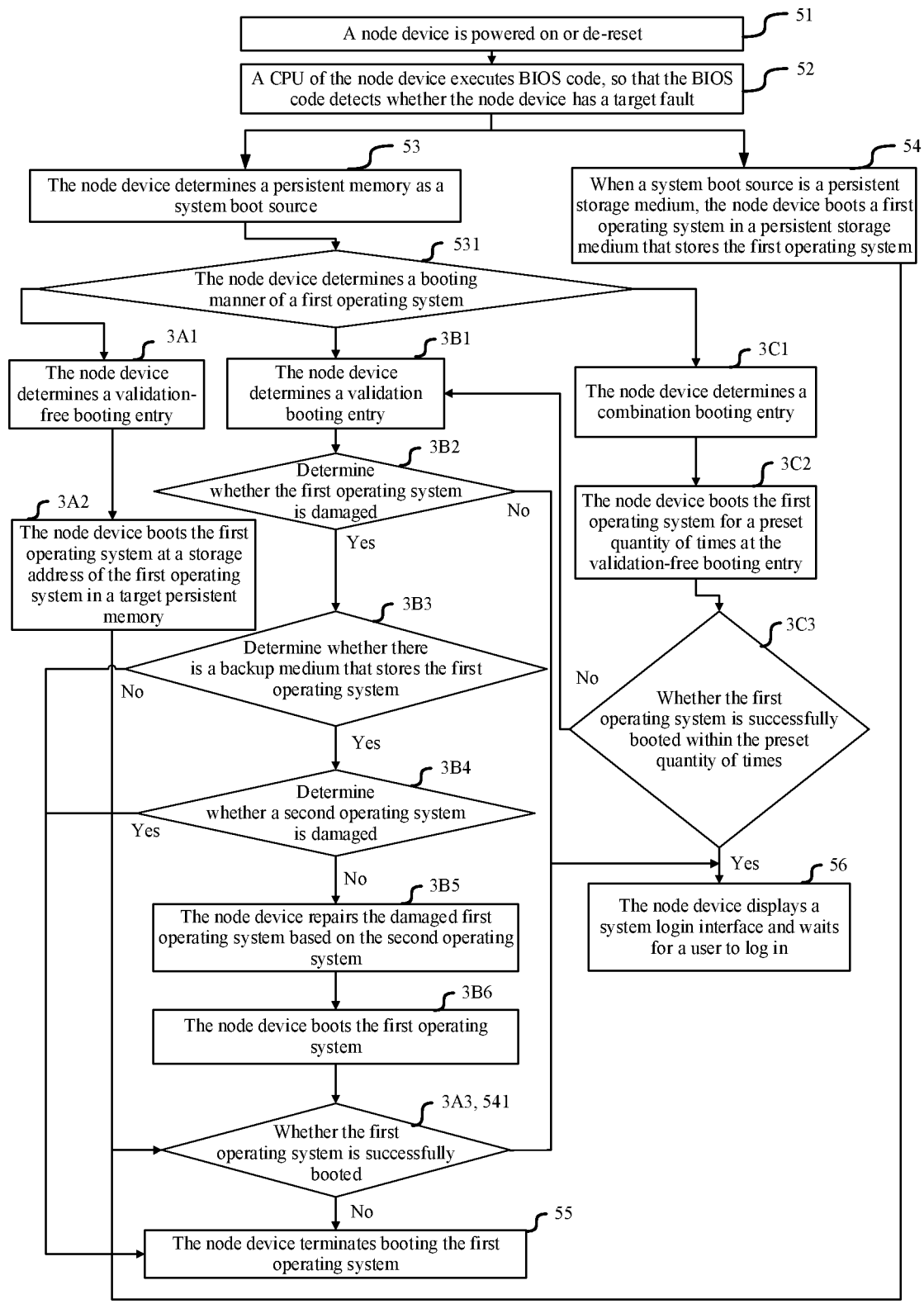
FIG. 5 is a schematic diagram of an operating system booting procedure according to an embodiment of this application.

To further describe the specific execution process shown in steps 401 to 408, refer to FIG. 5 for a schematic diagram of an operating system booting procedure according to an embodiment of this application. The booting procedure includes steps 51 to 56 below.

51. A node device is powered on or de-reset.

When the node device is powered on or de-reset, the node device begins to start, that is, performs the process shown in the following steps 52 to 56.

52. A CPU of the node device executes BIOS code, so that the BIOS code detects whether the node device has a target fault, and when the node device has no target faults, performs the following step 53 or 54.

53. The node device determines a system boot source as a persistent memory.

Step 531: When the system boot source is the persistent memory, the node device determines a booting manner of a first operating system.

The booting manner includes validation-free booting, validation booting, or combination booting. When the determined booting manner is validation-free booting, the validation-free booting procedure shown in the following steps 3A1 to 3A3, 55, and 56 is performed, when the determined booting manner is validation booting, the following steps 3B1 to 3B6, 55, and 56 are performed, or when the determined booting manner is validation-free booting, the following steps 3C1 to 3C3, 55, and 56 are performed.

Step 3A1: When the determined booting manner is validation-free booting, the node device determines a validation-free booting entry, where the validation-free booting entry includes a storage address of the first operating system to be booted, and the storage address of the first operating system is any address in a target persistent memory.

Step 3A2: The node device boots the first operating system at the storage address of the first operating system in the target persistent memory.

Step 3A3: The node device determines whether the first operating system is successfully booted.

When the first operating system is not successfully booted, step 55 is directly performed (that is, if an exception occurs during booting, the booting procedure is terminated). When the first operating system is not successfully booted, step 56 is directly performed (that is, the node device enters a login state, displays a system login interface, and waits for a user to log in).

Step 3B1: When the determined booting manner is validation booting, the node device determines a validation booting entry, where the validation booting entry includes a storage address of the first operating system to be booted and a storage address of a second operating system, and the second operating system is a copy of the first operating system.

Step 3B2: The node device determines whether the first operating system is damaged.

The node device determines, by using a target operation, whether the first operating system is damaged. If the first operating system is damaged, the node device may repair the damaged first operating system based on the first operating system. If the first operating system is not damaged, the node device may directly boot the first operating system.

Step 3B3: When the first node device is damaged, the node device determines whether there is a backup medium that stores the first operating system, and if there is no backup medium that stores the first operating system, performs step 55.

The backup medium may be any persistent memory, or may be any persistent storage medium. The validation booting entry includes the storage address of the second operating system. Therefore, if the second operating system is actually stored at the storage address, the node device has the backup medium, or if the second operating system is not stored at the storage address, no backup medium exists.

Step 3B4: When the backup medium exists, the node device determines whether the second operating system stored in the storage medium is damaged.

Step 3B5: When the second operating system is not damaged, the node device repairs the damaged first operating system based on the second operating system, or if the second operating system is damaged, performs step 55.

Step 3B6: After the first operating system is repaired, the node device boots the first operating system.

If booting succeeds, step 56 is performed. If booting fails, step 55 is performed to terminate booting the first operating system.

Step 3C1: When the determined booting manner is combination booting, the node device determines a combination booting entry, where the combination booting entry includes a validation-free booting entry and a validation booting entry.

Step 3C2: The node device boots the first operating system for a preset quantity of times at the validation-free booting entry.

Step 3C3: When the first operating system is successfully booted within the preset quantity of times, the node device directly performs step 56, or when the first operating system is not successfully booted within the preset quantity of times, the node device boots the first operating system through the process of validation booting.

54. When a system boot source is a persistent storage medium, the node device boots a first operating system in a persistent storage medium that stores the first operating system.

Step 541: The node device determines whether the first operating system is successfully booted, and if the first operating system is not successfully booted, the node device performs step 55, or if the first operating system is successfully booted, the node device performs step 56.

55. The node device terminates booting the first operating system.

56. The node device displays a system login interface and waits for a user to log in.

According to the method provided in this embodiment of this application, the first operating system to be booted is directly booted in the target persistent memory, thereby avoiding loading various types of information and configuring the operating system, and reducing boot time of the operating system. In addition, different booting manners are provided for different system boot sources. In addition, when a system boot source is a persistent memory, a plurality of booting manners are further provided, so that selectivity of the booting manner can be improved. In addition, each time the node device updates the first operating system, the node device may directly update the description information of the first operating system stored in the node device. In this way, when the node device subsequently determines whether the first operating system has a fault, the node device may quickly search for latest description information of the first operating system, and determine, based on the latest description information of the first operating system, whether the current first operating system is damaged, thereby improving determining efficiency.

Figure 6:
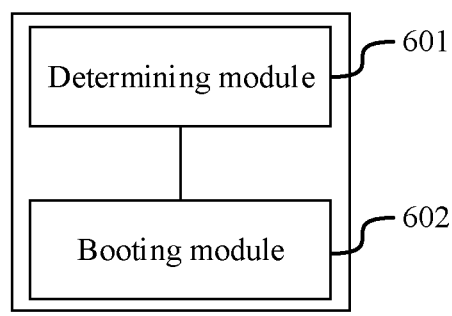
FIG. 6 is a schematic diagram of a structure of a system booting apparatus according to an embodiment of this application.

FIG. 6 is a schematic diagram of a structure of a system booting apparatus according to an embodiment of this application. The apparatus includes a determining unit 601 configured to determine a location, in a target persistent memory, of a first operating system to be booted by a node device, and a booting unit 602 configured to boot the first operating system in the target persistent memory based on the location of the first operating system in the target persistent memory.

Optionally, the determining unit 601 is further configured to perform step 403.

Optionally, the booting unit 602 is configured to perform step 62.

Optionally, the booting unit 602 is configured to perform steps 631 and 632.

Optionally, the apparatus further includes a termination unit configured to detect whether the second operating system stored in the target storage medium is damaged, and if the second operating system stored in the target storage medium is not damaged, perform the step of repairing the first operating system in the target persistent memory based on the second operating system in the target storage medium, or if the second operating system stored in the target storage medium is damaged, terminate booting the first operating system.

Optionally, the booting unit 602 is configured to perform a target operation on the first operating system based on the location of the first operating system in the target persistent memory, to obtain first description information, where the first description information is used to indicate the first operating system, and when the first description information is consistent with second description information, determine that the first operating system is not damaged, or when the first description information is not consistent with second description information, determine that the first operating system is damaged, where the second description information is used to indicate a target operating system which is updated to the first operating system.

Optionally, the apparatus further includes a display unit configured to display an operating system login interface when the first operating system is successfully booted, where the operating system login interface is used to log in to the first operating system.

All the foregoing optional technical solutions may be randomly combined to form the optional embodiments of the present disclosure, and details are not described herein.

It should be noted that, when the system booting apparatus provided in the foregoing embodiment boots an operating system, division of the foregoing function modules is merely used as an example for description. In actual application, the foregoing functions may be allocated to different function modules for implementation as required. That is, an internal structure of the apparatus is divided into different function modules, to implement all or some of the functions described above. In addition, the embodiments of the system booting method provided in the foregoing embodiments belong to a same concept. For a specific implementation process, refer to the method embodiments. Details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

What is claimed is:

1. A method comprising:
    determining a location of a first operating system to be booted by a node device in a target persistent memory;
    determining, based on the location, whether the first operating system is damaged by performing, based on the location, a target operation on the first operating system to obtain first description information indicating the first operating system, determining that the first operating system is not damaged when the first description information is consistent with second description information, wherein the second description information indicates a target operating system that is updated to the first operating system, and determining that the first operating system is damaged when the first description information is not consistent with second description information;
    booting the first operating system in the target persistent memory when the first operating system is not damaged; and
    when the first operating system is damaged:
        querying a target storage medium in the node device that stores a second operating system, wherein the second operating system is a backup of the first operating system;
        repairing, based on the second operating system, the first operating system to obtain a repaired first operating system; and
        booting the repaired first operating system in the target persistent memory.

2. The method of claim 1, further comprising determining a system boot source of the first operating system indicating a boot location of the first operating system, wherein the boot location comprises at least one of a persistent memory or a persistent storage medium.

3. The method of claim 1, wherein the target persistent memory has a read-write response delay of less than one microsecond (µs).

4. The system booting method of claim 1, further comprising:
    detecting whether the second operating system is damaged;
    performing the step of repairing the first operating system in the target persistent memory based on the second operating system in the target storage medium when the second operating system is not damaged; and
    terminating booting the first operating system when the second operating system is damaged.

5. The system booting method of claim 1, further comprising:
    directly booting, for a preset quantity of times based on the location, the first operating system in the target persistent memory; and
    determining that the first operating system is damaged when the first operating system is not successfully booted after having been booted for the preset quantity of times.

6. The method of claim 1, further comprising displaying an operating system login interface when the first operating system is successfully booted, wherein the operating system login interface logs in to the first operating system.

7. A node device comprising:
    a memory configured to store instructions; and a processor coupled to the memory, wherein the instructions when executed by the processor cause the node device to:
  determine a location of a first operating system to be booted by the node device in a target persistent memory; and
  determine, based on the location, whether the first operating system is damaged by performing, based on the location, a target operation on the first operating system to obtain first description information indicating the first operating system, determine that the first operating system is not damaged when the first description information is consistent with second description information, wherein the second description information indicates a target operating system that is updated to the first operating system, and determine that the first operating system is damaged when the first description information is not consistent with second description information;
  boot the first operating system in the target persistent memory when the first operating system is not damaged; and
  when the first operating system is damaged:
    query a target storage medium in the node device that stores a second operating system, wherein the second operating system is a backup of the first operating system;
    repair, based on the second operating system, the first operating system to obtain a repaired first operating system; and
    boot the repaired first operating system in the target persistent memory.

8. The node device of claim 7, wherein the instructions when executed by the processor further causes the node device to determine a system boot source of the first operating system indicating a boot location of the first operating system, and wherein the boot location comprises at least one of a persistent memory or a persistent storage medium.

9. The node device of claim 7, wherein the target persistent memory has a read-write response delay of less than one microsecond (µs).

10. The node device of claim 7, wherein the instructions when executed by the processor further cause the node device to:
  directly boot, for a preset quantity of times based on the location, the first operating system; and
  detect, based on the location, whether the first operating system is damaged when the first operating system is not successfully booted after having been booted for the preset quantity of times.

11. The node device of claim 10, wherein the instructions when executed by the processor further cause the node device to:
  detect whether the second operating system is damaged;
  repair, based on the second operating system, the first operating system when the second operating system is not damaged; and
  terminate booting the first operating system when the second operating system is damaged.

12. The node device of claim 7, wherein the instructions when executed by the processor further cause the node device to display an operating system login interface when the first operating system is successfully booted, and wherein the operating system login interface logs in to the first operating system.

13. A non-transitory computer-readable storage medium storing computer-executable instructions that, when executed by a processor, cause a node device to:
  determine a location of a first operating system to be booted by the node device in a target persistent memory; and
  determine, based on the location, whether the first operating system is damaged by performing, based on the location, a target operation on the first operating system to obtain first description information indicating the first operating system, determine that the first operating system is not damaged when the first description information is consistent with second description information, wherein the second description information indicates a target operating system that is updated to the first operating system, and determine that the first operating system is damaged when the first description information is not consistent with second description information;
  boot the first operating system in the target persistent memory when the first operating system is not damaged; and
  when the first operating system is damaged:
    query a target storage medium in the node device that stores a second operating system, wherein the second operating system is a backup of the first operating system;
    repair, based on the second operating system, the first operating system to obtain a repaired first operating system; and
    boot the repaired first operating system in the target persistent memory.

14. The non-transitory computer-readable storage medium of claim 13, wherein the computer-executable instructions further cause the node device to determine a system boot source of the first operating system, wherein the system boot source indicates a boot location of the first operating system, and wherein the boot location comprises at least one of a persistent memory or a persistent storage medium.

15. The non-transitory computer-readable storage medium of claim 13, wherein the target persistent memory has a read-write response delay of less than one microsecond (µs).

16. The non-transitory computer-readable storage medium of claim 13, wherein the computer-executable instructions further cause the node device to:
  directly boot, for a preset quantity of times based on the location, the first operating system; and
  determine, based on the location, that the first operating system is damaged when the first operating system is not successfully booted after having been booted for the preset quantity of times.

17. The non-transitory computer-readable storage medium of claim 16, wherein the computer-executable instructions further cause the node device to:
  detect whether the second operating system is damaged;
  repair, based on the second operating system, the first operating system when the second operating system is not damaged; and
  terminate booting the first operating system in the target persistent memory when the second operating system is damaged.

* * * * *

UNITED STATES PATENT AND TRADEMARK OFFICE
CERTIFICATE OF CORRECTION

| | | |
|---|---|---|
| PATENT NO. | : 12,001,285 B2 | Page 1 of 1 |
| APPLICATION NO. | : 17/704713 | |
| DATED | : June 4, 2024 | |
| INVENTOR(S) | : Ming Chen | |

It is certified that error appears in the above-identified patent and that said Letters Patent is hereby corrected as shown below:

On the Title Page

Page 2 - item (56) FOREIGN PATENT DOCUMENTS: "IN 105389190 A 3/2016" should read "CN 105389190 A 3/2016"

In the Claims

Claim 4, Column 18, Line 43: "The system booting method of claim 1, further com-" should read "The method of claim 1, further com-"

Claim 5, Column 18, Line 53: "The system booting method of claim 1, further com-" should read "The method of claim 1, further com-"

Signed and Sealed this
Thirtieth Day of July, 2024

Katherine Kelly Vidal
*Director of the United States Patent and Trademark Office*